United States Patent Office 3,646,109
Patented Feb. 29, 1972

3,646,109
BENZYLAMINE SUBSTITUTED CARBAMATES
John Shavel, Jr., Mendham, and George Bobowski, Morristown, N.J., assignors to Warner-Lambert Company, Morris Plains, N.J.
No Drawing. Original application May 18, 1966, Ser. No. 550,952, now Patent No. 3,452,048. Divided and this application Nov. 22, 1968, Ser. No. 778,338
Int. Cl. C07c *125/06*
U.S. Cl. 260—471 C  4 Claims

ABSTRACT OF THE DISCLOSURE

A class of substituted benzylamines of the formula:

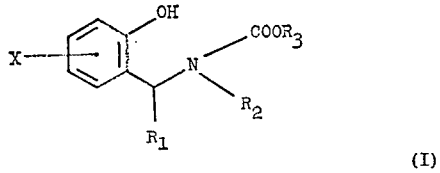

(I)

wherein X is hydrogen, lower alkoxy; $R_1$ is heterocyclic; $R_2$ is lower alkyl or lower alkenyl; and $R_3$ is lower alkyl.
These compounds are useful as anti-microbial agents.

The present application for United States Letters Patent is a divisional application of our copending U.S. application Ser. No. 550,952, filed May 18, 1966 now U.S. Patent 3,452,048.

This invention relates to substituted benzylamines of the formula:

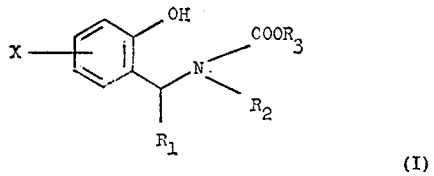

(I)

wherein X is hydrogen, lower alkoxy, such as methoxy or ethoxy, and halogen; $R_1$ represents furyl, 2-lower alkylfuryl, 2-ketocyclohexyl, lower alkoxy, 3-methyl-2-quinoxalinyl; $R_2$ represents lower alkyl or lower alkenyl and $R_3$ represents lower alkyl.

In the above definitions, lower alkyl is from 1 to 6 carbon atoms, such as methyl, ethyl, propyl, isopropyl, butyl, and isobutyl, and lower alkenyl is from 2 to 6 carbon atoms, such as ethynyl and the like. Halogen includes all four members of its family, i.e., chlorine, bromine, fluorine and iodine.

The compounds of this invention are useful as antimicrobial agents against *C. albicans*. In order to use these compounds as anti-microbials, about 1 part by weight of a selected active ingredient is blended with about 99 parts by weight of an inert carrier such as talc or petrolatum. The resulting product may be applied topically.

According to the process of this invention the above compounds are prepared by subjecting compounds of the formula:

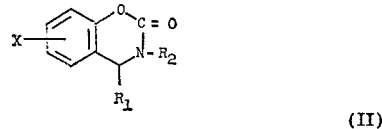

(II)

to a solvolysis process in alcohol in the presence of an alkali. The reaction that takes place may be represented by the following scheme:

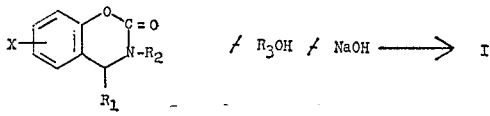

(II)

The symbols X, $R_1$, $R_2$ and $R_3$ are as defined.

This solvolysis process may be effected at ambient temperature such as from 20°–30° C. for a period of about 2–6 hours.

The preparation of the starting material II above is fully disclosed and described in our copending application Ser. No. 504,142, filed Oct. 23, 1965 now U.S. Pat. 3,446,804.

The following examples are included in order further to illustrate the invention. All temperatures referred to in these examples are given in degrees centigrade and room temperature is from about 20° to 30° C.

EXAMPLE 1

Methyl[α-(2-furyl)-o-hydroxybenzyl]methylcarbamate

A mixture of 2.0 g. of 3,4-dihydro-4-(2-furyl)-3-methyl-2H-1,3-benzoxazin-2-one and 0.8 g. of sodium hydroxide pellets in 10 ml. of absolute methanol are stirred until a clear, yellow solution results, and allowed to stand at room temperature. The residue is dissolved in water, adjusted to pH 5.0 with acetic acid, and extracted twice with 50 ml. of chloroform. The combined extracts are dried over sodium sulfate and the solvent is removed in vacuo. Trituration with methanol gives 1.2 g. of methyl [α-(2-furyl)-o-hydroxybenzyl]methylcarbamate as off-white crystals, M.P. 140–141°, dec. Recrystallization from methanol gives analytically pure, nearly white crystals, M.P. 142–143°, dec.

Analysis for $C_{14}H_{15}NO_4$.—Calcd. (percent): C, 64.36; H, 5.79; N, 5.36. Found (percent): C, 64.67, 64.56; H, 5.91, 5.88; N, 5.46, 5.43.

EXAMPLE 2

Methyl[α-(2-furyl-5-methyl)-o-hydroxybenzyl] methylcarbamate

The procedure of Example 1 is applied to the 5-methyl analogue except that ether-cyclohexane (1:1) is used as a recrystallization solvent. Thus, the mixture of 6.9 g. of 3,4-dihydro-4-(2-furyl)-5-methyl)-3-methyl-2H-1,3-benzoxazin-2-one and 1.0 g. of sodium hydroxide pellets in 25 ml. of absolute methanol gives 3.8 g. of methyl [α-(2-furyl-5-methyl)-o-hydroxybenzyl]methylcarbamate as analytically pure, white crystals, M.P. 100–101°, dec.

Analysis for $C_{15}H_{17}NO_4$.—Calcd. (percent): C, 65.44; H, 6.22; N, 5.09. Found (percent): C, 65.14; H, 6.25; N, 5.26.

EXAMPLE 3

Ethyl[α-(2-furyl)-o-hydroxybenzyl]methylcarbamate

Applying the same procedure as in the Example 1 and using absolute ethanol instead of methanol, ethyl[α-(2-furyl)-o-hydroxybenzyl]methylcarbamate is obtained. An analytical sample is obtained by the recrystallization from cyclohexane, M.P. 104.5–106°.

Analysis for $C_{15}H_{17}NO_4$.—Calcd. (percent): C, 65.44; H, 6.22; N, 5.09. Found (percent): C, 65.36; H, 6.27; N, 4.96.

EXAMPLE 4

Ethyl[(o-hydroxyphenyl)(2-oxocyclohexyl)methyl]carbamate

A mixture of 4.0 g. of 3,4-dihydro-4-(2-oxo-cyclohexyl)-3-methyl-2H-1,3-benzoxazin-2-one, and 0.7 g. of sodium hydroxide pellets in 40 ml. of absolute ethanol is stirred for 10 minutes and the resulting clear yellow solution is allowed to stand for two hours. Ice-cold water is added and the solution is adjusted to pH 5.0 with acetic acid. After the excess ethanol is removed at room temperature, the residue is extracted twice with 50 ml. of chloroform. The combined extracts are dried over sodium sulfate and the solvent is removed in vacuo. Trituration of the residue with ethyl acetate gives 2.9 g. of ethyl[(o-hydroxyphenyl)(2-oxocyclohexyl)methyl]carbamate as white crystals, M.P. 247–248°. Two recrystallizations from ethyl acetate gives analytically pure, white crystals, M.P. 248–249°, decomp.

Analysis for $C_{17}H_{23}NO_4$.—Calcd. (percent): C, 66.86; H, 7.59; N, 4.59. Found (percent): C, 66.77; H, 7.63; N, 4.46.

EXAMPLE 5

Methyl(2-hydroxy-α,3-dimethoxybenzyl)methylcarbamate

A mixture of 2.0 g. of 3,4-dihydro-4,8-dimethoxy-3-methyl-2H-1,3-benzoxazin-2-one and 0.7 g. of NaOH pellets in 20 ml. of absolute methanol is stirred for 20 minutes and then the clear solution is allowed to stand at room temperature overnight. The solution is adjusted to pH 5.0 with ice-cold acetic acid and the solvent is removed at room temperature. The residue is taken up with a little water and extracted with 50 ml. of chloroform. The chloroform extract is washed with water, dried over $Na_2SO_4$, and the solvent evaporated. Trituration with cyclohexane-ether (5:1) gives 1.7 g. of methyl(2-hydroxy-α,3-dimethoxybenzyl)methylcarbamate as off-white crystals, M.P. 78–80°. Recrystallization from cyclohexane gives analytically pure white crystals, M.P. 78.5–80°.

Analysis for $C_{12}H_{17}NO_5$.—Calcd. (percent): C, 56.46; H, 6.71; N, 5.49. Found (percent): C, 56.53; H, 7.01; N, 5.68.

EXAMPLE 6

Methyl[1-(o-hydroxyphenyl)-2-(3-methyl-2-quinoxalinyl)ethyl]methylcarbamate

A mixture of 4.5 g. of 2-(3,4-dihydro-3-methyl-2-oxo-2H-1,3-benzoxazin-4-ylmethyl)-3-methylquinoxaline and 2.0 g. of KOH pellets in 30 ml. of dry methanol is stirred for 15 minutes, and the resulting clear solution is allowed to stand for 45 minutes at room temperature. Acetic acid is added at 0° to pH 5.5 and the solvent is removed under nitrogen at 45°. The residue is taken up with 15 ml. of water and extracted twice with 50 ml. of chloroform. The combined chloroform extracts are washed with water, dried over $Na_2SO_4$, and the solvent is removed under nitrogen. Single crystallization from ethyl acetate gives 4.3 g. of methyl[1-(o-hydroxyphenyl)-2-(3-methyl-2-quinoxalinyl)ethyl]methylcarbamate as analytically pure white crystals, M.P. 143–144°.

Analysis for $C_{20}H_{21}N_3O_3$.—Calcd. (percent): C, 68.36; H, 6.02; N, 11.96. Found (percent): C, 68.19; H, 5.86; N, 11.69.

EXAMPLE 7

Diethyl(2-hydroxy-3-methoxybenzylidene)dicarbamate

A mixture of 4.2 g. of ethyl 3-allyl-3,4-dihydro-8-methoxy-2-oxo-2H-1,3-benzoxazine-4-carbamate, and 1.5 g. of NaOH-pellets in 25 ml. of absolute ethanol is stirred for 10 minutes and the resulting clear solution is allowed to stand at room temperature for two hours. Acetic acid is added at 0° to pH 5.5 and the solvent is removed in vacuo at 30°. The residue is taken up with ethyl acetate, washed with water, dried over $Na_2SO_4$, and the solvent evaporated. The material is passed over 30 g. of magnesium silicate, ether-ethyl acetate (1:1) being used as eluents. Ten (40 ml. each) fractions are collected and the fractions 3 to 6, on trituration with ethyl acetate, gives 0.3 g. of diethyl(2-hydroxy-3-methoxybenzylidene)dicarbamate as white crystalline product, M.P. 142–143°. Recrystallization from ethyl acetate gives analytically pure material, M.P. 143–144°.

Analysis for $C_{14}H_{20}N_2O_6$.—Calcd. (percent): C, 53.84; H, 6.45; N, 8.97. Found (percent): C, 53.95; H, 6.54; N, 8.86.

We claim:
1. A compound of the formula:

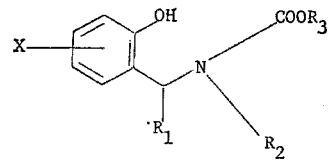

wherein X is hydrogen, or lower alkoxy; $R_1$ is 2-ketocyclohexyl, or lower alkoxy; $R_2$ is lower alkyl or lower alkenyl and $R_3$ is lower alkyl.

2. Ethyl carbamate.

3. A compound of claim 1 which is methyl(2-hydroxy-α,3-dimethoxybenzyl)methylcarbamate.

4. Diethyl(2-hydroxy-3-methoxybenzylidine)dicarbamate.

References Cited

UNITED STATES PATENTS 3,256,278    6/1966    Petracek _____ 260—471

LORRAINE A. WEINBERGER, Primary Examiner

L. A. THAXTON, Assistant Examiner

U.S. Cl. X.R.

260—347.4, 250 R; 242—250, 285, 300